United States Patent
Caffrey (10) Patent No.: US 10,885,462 B2
(45) Date of Patent: Jan. 5, 2021

(54) DETERMINE AN INTERVAL DURATION AND A TRAINING PERIOD LENGTH FOR LOG ANOMALY DETECTION

(71) Applicant: INTERNATIONAL BUSINESS MACHINES CORPORATION, Armonk, NY (US)

(72) Inventor: James M. Caffrey, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 836 days.

(21) Appl. No.: 15/197,854

(22) Filed: Jun. 30, 2016

(65) Prior Publication Data

US 2018/0005133 A1 Jan. 4, 2018

(51) Int. Cl.
| | |
|---|---|
| *G06F 11/00* | (2006.01) |
| *G06F 11/07* | (2006.01) |
| *G06F 11/30* | (2006.01) |
| *G06F 21/55* | (2013.01) |
| *G06K 9/00* | (2006.01) |
| *G06K 9/62* | (2006.01) |
| *G06N 20/00* | (2019.01) |

(52) U.S. Cl.
CPC ........... *G06N 20/00* (2019.01); *G06F 21/552* (2013.01); *G06K 9/6223* (2013.01); *G06F 11/00* (2013.01); *G06K 9/0055* (2013.01); *G06K 9/6253* (2013.01); *G06K 9/6298* (2013.01)

(58) Field of Classification Search
CPC .................................................. G06N 99/005
See application file for complete search history.

(56) References Cited

U.S. PATENT DOCUMENTS

| | | | |
|---|---|---|---|
| 2015/0058994 A1 | 2/2015 | Honig et al. | |
| 2016/0086097 A1* | 3/2016 | Zhang | G06N 99/005 706/12 |
| 2017/0094537 A1* | 3/2017 | Yang | H04W 24/04 |

OTHER PUBLICATIONS

Xu et al. ("Online System Problem Detection by Mining Patterns of Console Logs", ICDM 2009, The Ninth IEEE International Conference on Data Minining, Miami, Fl, Dec. 6-9, 2009, pp. 1-10) (Year: 2009).*
Rodriguez et al. ("Improving Network Security through Traffic Log Anomaly Detection Using Time Series Analysis" Herrero, A et al. (Eds.) in Computational Intelligence in Security for Information Systems 2010. Advances in Soft Computing, vol. 85, pp. 125-133, 2010) (Year: 2010).*

(Continued)

*Primary Examiner* — Kakali Chaki
*Assistant Examiner* — Robert Lewis Kulp
(74) *Attorney, Agent, or Firm* — Cantor Colburn LLP; Teddi Maranzano (57) ABSTRACT

Examples of techniques for determining an interval duration and a training period length for log anomaly detection are disclosed. In one example implementation according to aspects of the present disclosure, a computer-implemented method may include: determining, by a processing resource, an interval duration for a time series from a plurality of message IDs; and determining, by the processing resource, a training period length based on the interval duration.

20 Claims, 5 Drawing Sheets

(56) References Cited

OTHER PUBLICATIONS

Brandom Pincombe ("Anomaly Detection in Time Series of Graphs using ARMA Processes", ASOR Bulletin, 24(4) 2-10, 2005) (Year: 2005).*

Marcel Dettling ("Applied Time Series Analysis FS 2012", Institute for Data Analysis and Process Design, Zurich Univeristy of Applied Science, 133 pages, retrieved from archive.org stat.ethz.ch/education/semesters/ss2012/atsa/ATSA-Scriptum-SS2012-120521.pdf Feb. 13, 2015) (Year: 2015).*

Virginia Tech ("Measures of Central Tendency: Mean, Median, and Mode", retrieved from archive.org http://geosim.cs.vt.edu/Sable/converted/MMM/ Feb. 1, 2016) (Year: 2016).*

Duke University ("Identifying the Orders of AR and MA terms in an ARIMA model", retrieved from archive.org https://people.duke.edu/~mau/411arim3.htm Mar. 1, 2016) (Year: 2016).*

Zhu et al. ("Revisit Dynamic ARIMA Based Anomaly Detection", 2011 IEEE International Conference on Privacy, Security, Risk, and Trust, and IEEE Conference on Social Computing, 2011, pp. 1263-1268) (Year: 2011).*

Gupta et al. ("Outlier Detection for Temporal Data: A Survey", IEEE Trans. On Knowledge and Data Engineering, vol. 26, No. 9, Sep. 2014, pp. 2250-2267) (Year: 2014).*

Of Calyam et al ("Modeling of Multi-resolution Active Network Measurement Time-Series", 2008 33rd IEEE Conference on Local Computer Networks (LCN), Montreal, Que, 2008, pp. 900-907) (Year: 2008).*

Xu et al. ("Online System Problem Detection by Mining Patterns of Console Logs", ICDM 2009, The Ninth IEEE International Conference on Data Mining, Miami, Fl, Dec. 6-9, 2009, pp. 1-10) (Year: 2009).*

Of Calyam et al ("Modeling of Multi-resolution Active Network Measurement Time-Series", 2008 33rd IEEE Conference on Local Computer Networks (LCN), Montreal, Que, 2008, pp. 900-907) (Year: 2008).*

Chan et al., "Modeling Multiple Time Series for Anomaly Detection," Fifth IEEE International Conference on Data Mining, IEEE, Nov. 2005, pp. 1-8.

Gupta et al., "Context-Aware Time Series Anomaly Detection for Complex Systems," Workshop Notes, Second Workshop on Data Mining for Service and Maintenance, May 4, 2013, pp. 1-9.

Martin Lauer, "A Mixture Approach to Novelty Detection using Training Data with Outliers," Machine Learning: ECML 2001, Springer Berlin Heidelberg, 2001, pp. 300-311.

Wang et al., "Workload-Aware Online Anomaly Detection in Enterprise Applications with Local Outlier Factor," 2012 IEEE 36th Annual Computer Software and Applications Conference, IEEE, 2012, pp. 25-34.

* cited by examiner

DETERMINE AN INTERVAL DURATION AND A TRAINING PERIOD LENGTH FOR LOG ANOMALY DETECTION

BACKGROUND

The present techniques relate generally to anomaly detection and, more specifically, to determining interval duration and training period length for log anomaly detection.

A large number of logs are generated by information technology (IT) and/or internet of things (IoT) solutions. These logs may be evaluated, such as by an anomaly detection engine. These logs contain many entries and consequently, there are a large number of combinations of features and parameters, which need to be set to create an appropriate anomaly model based on the log data.

SUMMARY

According to examples of the present disclosure, techniques including methods, systems, and/or computer program products for determining an interval duration and a training period length for log anomaly detection are provided. An example method may include: determining, by a processing resource, an interval duration for a time series from a plurality of message IDs; and determining, by the processing resource, a training period length based on the interval duration.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of determining interval duration and training period length for log anomaly detection. For anomaly detection to work on IT logs and IoT logs from embedded IT devices, the cost and complexity of determining whether anomaly detection will work for a particular type of log and what parameters should be used to detect the anomalies needs to be reduced.

Current approaches to anomaly detection fail to provide systematic or machine assisted mechanisms for applying classic statistical techniques of statistical interference and visualization to assist data scientists or maintainers of the system generating the logs to determine if current anomaly detection can be applied to reduce the mean time to recovery or to identify problems earlier. The present disclosure describes how to apply a systematic, automated approach using a set of statistical techniques to define a model based on learning the characteristics of the log data provided. The key parameters that this approach can identify are: into what length of an interval should the logs be split (e.g., ten minutes, two hours, thirty seconds, etc.); and the duration of the training set needed for the suggested interval duration. For many types of logs, the present techniques approach is to determine if a log can be processed by an anomaly detection machine such as IBM zAware.

The present techniques provide for determining, based on the content of a representative set of logs, the interval duration and length of training period for long anomaly detection. Current approaches require extensive, manual, and time consuming data science efforts as well as extensive processing system resources (e.g., memory, processor, data storage, etc.).

The present techniques use existing anomaly detection parsers and system groupers (i.e., model groups) to generate a number of messages at a very small interval. This information is then processed to determine a suggested interval duration, and a recommendation for the interval duration is provided to a user such as a data scientist. The interval duration is then utilized to identify the length of the training period. The present techniques utilize fewer system resources (e.g., memory, processor, data storage) and perform faster than existing approaches. These and other advantages will be apparent from the description that follows.

Figure 1:
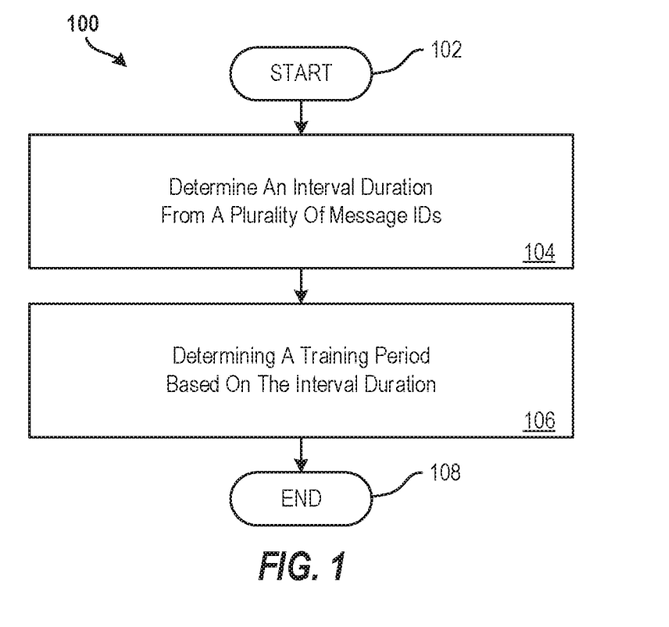
FIG. 1 illustrates a flow diagram of a method to determine an interval duration and a training period length for log anomaly detection according to aspects of the present disclosure.

FIG. 1 illustrates a flow diagram of a method 100 to determine an interval duration and a training period length for log anomaly detection according to aspects of the present disclosure. The method 100 may be performed, for example by a processing system such as the processing system 20 of FIG. 4 or by another suitable processing system. The method 100 starts at block 102 and continues to block 104.

Figure 2A:
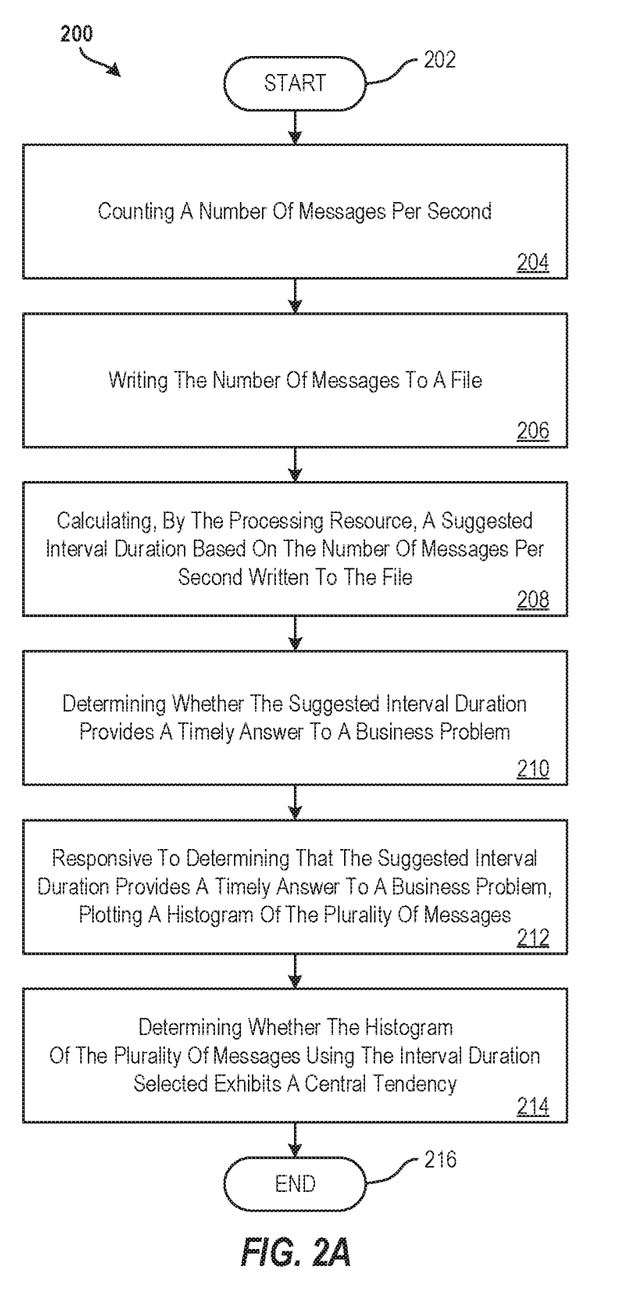
FIG. 2A illustrates a flow diagram of a method to determine an interval duration for a time series from a plurality of message IDs according to aspects of the present disclosure.

At block 104, the method 100 includes determining an interval duration for a time series from a plurality of message IDs. The objective is to determine if any of following interval-based scorers currently used for Z/OS™ and LINUX™ syslogd log anomaly detection will work for a specific interval duration: the number of intervals that a message occurs in an interval, the number of messages within an interval, and tree augmented naïve Bayesian clustering These scorers provide a more sophisticated analysis of the log than a simple confidence interval analysis by accounting for expected patterns of messages which occur often. If a simple confidence interval-based analysis does not work because the interval duration is too small (i.e., a large number of empty intervals is generated) or is too large (i.e., the variation is hidden because of the central limits theorem), then the interval is unlikely to work for a more sophisticated set of scorers. Determining an interval duration is described in more detail below with reference to FIG. 2. The method 100 continues to block 106.

At block 106, the method 100 includes determining a training period length based on the interval duration. Determining the training period length is described in more detail below with reference to FIG. 3. The method 100 continues to block 108 and ends.

Additional processes also may be included, and it should be understood that the processes depicted in FIG. 1 represent illustrations, and that other processes may be added or existing processes may be removed, modified, or rearranged without departing from the scope and spirit of the present disclosure.

FIG. 2A illustrates a flow diagram of a method 200 to determine an interval duration for a time series from a plurality of message IDs according to aspects of the present disclosure. The method 200 may be performed, for example by a processing system such as the processing system 20 of FIG. 4 or by another suitable processing system. The method 200 starts at block 202 and continues to block 204.

At block 204, the method 200 includes counting a number of messages per second. At block 206, the method 200 includes writing the number of messages per second to a file.

At block 208, the method 200 includes calculating a suggested interval duration based on the number of messages per second written to the file. This may determine that if the set of logs is a reasonable approximation of the logs to be analyzed, then anomaly detection is unlikely to be successful.

At block 210, the method 200 includes determining whether the suggested interval duration provides a timely answer to a business problem. For example, if the length of the interval suggested is 6 hours and anomalies need to be detected within 30 seconds, then even though the log can be processed the results do not timely meet the business need and thus is not an answer to a business problem.

At block 212, the method 200 includes plotting a histogram of the plurality of messages. At block 214, the method 200 includes determining whether the histogram of the plurality of messages using the interval duration selected exhibits a central tendency. A central tendency indicates a single modal centered around a mean number of messages.

The method 200 continues to block 216 and ends. Additional processes also may be included, and it should be understood that the processes depicted in FIG. 2A represent illustrations, and that other processes may be added or existing processes may be removed, modified, or rearranged without departing from the scope and spirit of the present disclosure.

Figure 2B:
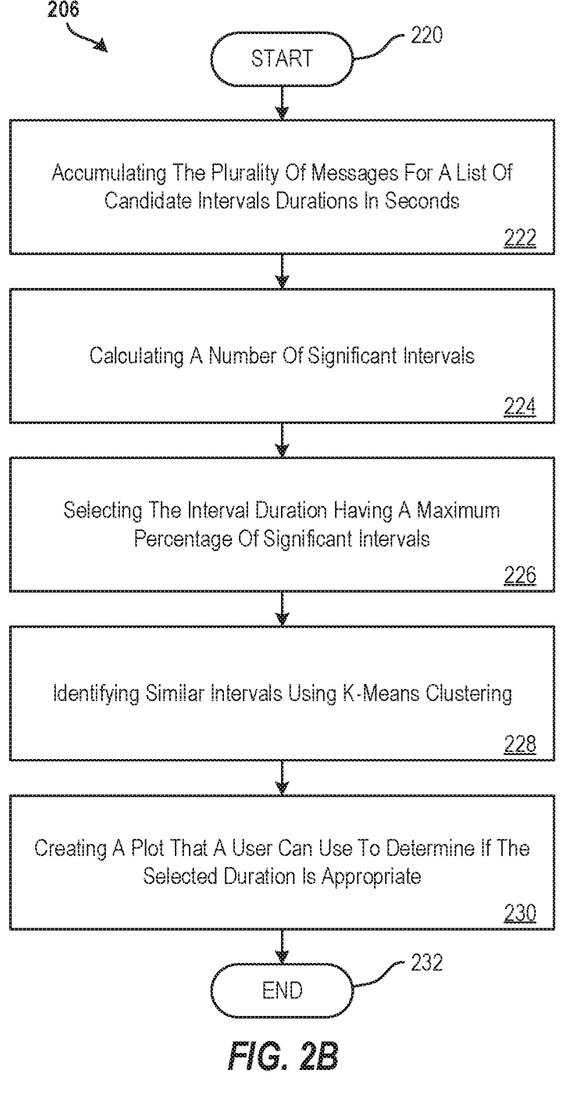
FIG. 2B illustrates a flow diagram of a method for calculating the suggested interval duration and similar interval durations based on the number of messages per second written to the file according to aspects of the present disclosure.

FIG. 2B illustrates a flow diagram of a method 206 for calculating the suggested interval duration based on the number of messages per second written to the file according to aspects of the present disclosure. The method 206 may be performed, for example by a processing system such as the processing system 20 of FIG. 4 or by another suitable processing system. The method 206 starts at block 220 and continues to block 222.

At block 222, the method 206 includes accumulating the plurality of messages for a list of candidate intervals durations in seconds. For example, candidate interval durations (in seconds) may include: 1, 2, 3, 4, 5, 10, 20, 30, 40, 50, 60, 90, 120, 300, 600, 1200, 1800, 3600, 7200, 10800, 21600, 43200, 86400, 172800, etc. In other examples, other candidate interval durations may be utilized.

At block 224, the method 206 includes calculating a number of significant intervals (i.e., a number of messages IDs in the interval of duration n that are outside of a confidence interval). Examples of a confidence interval may be 99%, 99.5%, 99.9%, and the like. A low limit may be set equal to the mean of the number of messages for duration n minus (example of R code qnorm (confidence interval) *standard deviation of the number of messages for the duration n). Similarly, an upper limit may be set equal to the mean of number of messages for duration n plus (example of R code qnorm (confidence interval)*standard deviation of the number of messages for duration n).

At block 226, the method 206 includes selecting the interval duration having a maximum percentage of significant intervals. This may be performed, for example, by calculating the percentage of significant intervals of total intervals for each candidate interval duration, discarding interval duration(s) that have a percentage equal to 100% (i.e., too many empty intervals), and discarding the interval duration(s) which have a percentage equal to 0% (i.e., no variation within the interval(s)). If no interval duration(s) remain, then an anomaly detector is unlikely to work. If interval duration(s) remain, then from the remaining interval durations, selecting the interval duration which has the greatest percentage of significant intervals.

At block 228, the method 206 includes identifying similar intervals using k-means clustering. According to aspects of the present disclosure, the number of clusters is the square root of the number of interval durations with a percentage of significant intervals not equal to 1. The number of iterations is ten times number of clusters in some examples, although other variations are possible.

At block 230, the method 206 includes creating a plot that a user can use to determine if the selected duration is appropriate. For example, the following plots may be created: a percentage of intervals with no messages (empty intervals) for potential interval duration (log of interval duration); a percentage of intervals with significant number of messages for potential intervals duration (log of interval duration); a mean number of messages for potential interval durations (log of interval duration); and the number of messages within each interval of the selected duration.

The method 206 continues to block 232 and ends. Additional processes also may be included, and it should be understood that the processes depicted in FIG. 2B represent illustrations, and that other processes may be added or existing processes may be removed, modified, or rearranged without departing from the scope and spirit of the present disclosure.

Figure 3:
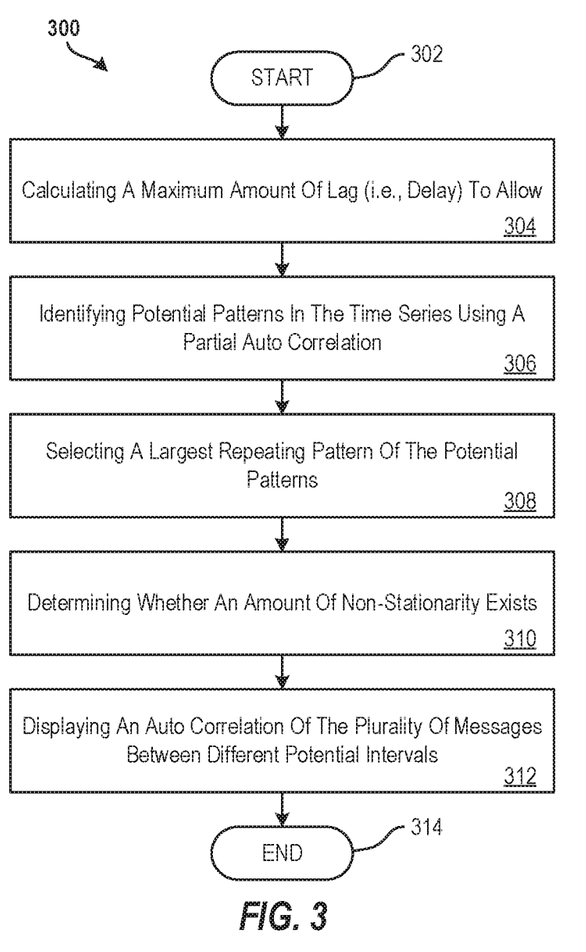
FIG. 3 illustrates a flow diagram of a method for determining a training period length based on the interval duration according to aspects of the present disclosure.

FIG. 3 illustrates a flow diagram of a method 300 for determining a training period length based on the interval duration according to aspects of the present disclosure. The method 300 may be performed, for example by a processing system such as the processing system 20 of FIG. 4 or by another suitable processing system. The method 300 starts at block 302 and continues to block 304.

At block 304, the method 300 includes calculating a maximum amount of lag (i.e., delay) to allow. At block 306, the method 300 includes identifying potential patterns in the time series using a partial auto correlation.

At block 308, the method 300 includes selecting a largest repeating pattern of the potential patterns. In examples, the largest repeating pattern is determined by the largest number of messages during an interval. Selecting the largest repeating pattern may include calculating a confidence interval around zero (i.e., no autocorrelation) using the number of intervals and selecting the largest significant lag.

At block 310, the method 300 includes determining whether an amount of non-stationarity (i.e., the difference among categories of time intervals) exists. At block 312, the method includes displaying an auto correlation of the plurality of messages between different potential intervals. The method 300 continues to block 314 and ends.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
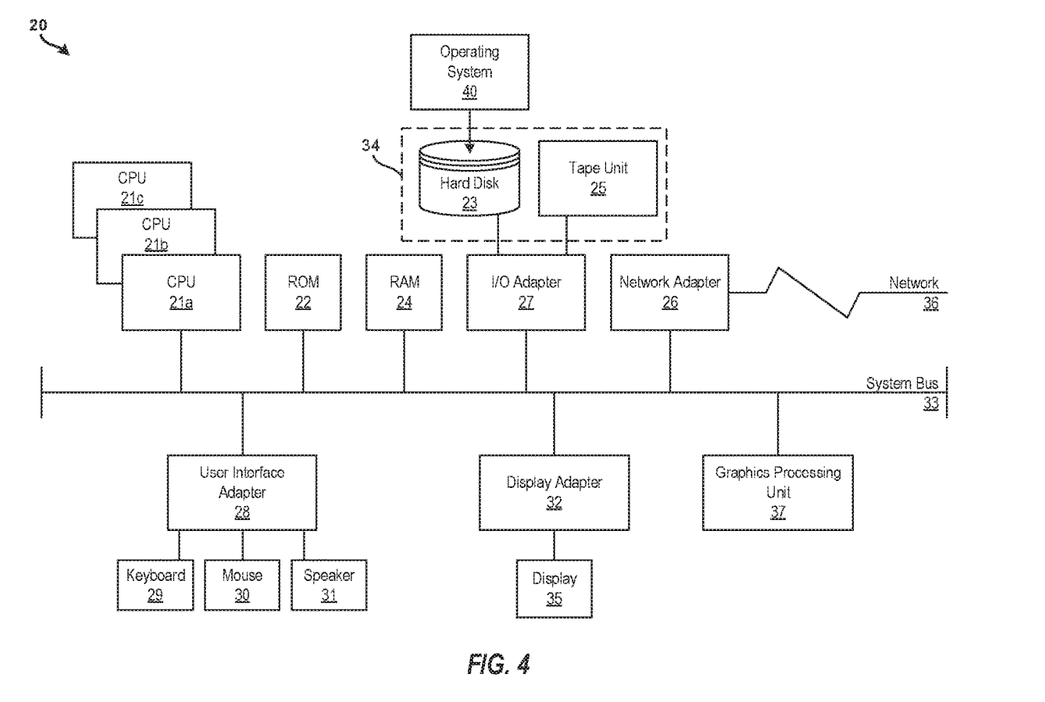
FIG. 4 illustrates a block diagram of a processing system for implementing the techniques described herein according to aspects of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for determining an interval duration and a training period length for log anomaly detection, the method comprising:

determining, by a processing resource, an interval duration for a time series from a plurality of message IDs, wherein determining the interval duration further comprises calculating, by the processing resource, a suggested interval duration based on a number of messages per second written to a file by accumulating a plurality of messages for a list of candidate interval durations in seconds, calculating a number of significant intervals, selecting an interval duration from the list of candidate interval durations that has a maximum percentage of significant intervals, and identifying similar intervals to the selected interval duration, wherein the selecting the interval duration from the list of candidate interval durations that has the maximum percentage of significant intervals is performed by calculating a percentage of significant intervals of total intervals for each candidate interval duration, discarding any interval duration from the list of candidate interval durations that has a percentage equal to 0% or 100%;

determining, by the processing resource, a training period length based at least in part on the interval duration, wherein determining the training period length further comprises identifying a plurality of potential patterns in the time series using a partial auto correlation and selecting a largest repeating pattern of the plurality of potential patterns, wherein selecting the largest repeating pattern comprises calculating a confidence interval based at least in part on a number of intervals and selecting a largest significant lag;

training a log anomaly detector based at least in part on the training period length; and performing, by the log anomaly detector, log anomaly detection.

2. The computer-implemented method of claim 1, wherein determining the interval duration further comprises:
counting the number of messages per second; and
writing the number of messages to the file.

3. The computer-implemented method of claim 2, wherein determining the interval duration further comprises:
determining whether the suggested interval duration provides a timely answer to a business problem.

4. The computer-implemented method of claim 3, wherein determining the interval duration further comprises:
responsive to determining that the suggested interval duration provides a timely answer to a business problem, plotting a histogram of the plurality of messages; and
determining whether the histogram of the plurality of messages using the interval duration selected exhibits a central tendency.

5. The computer-implemented method of claim 1, wherein determining the training period length further comprises:
calculating a maximum amount of lag to allow.

6. The computer-implemented method of claim 1, wherein determining the training period length further comprises:
determining whether an amount of non-stationarity exists.

7. The computer-implemented method of claim 6, wherein determining the training period length further comprises:
responsive to determining that an amount of non-stationarity exists, displaying an auto correlation of the plurality of messages between the plurality of potential patterns.

8. The computer-implemented method of claim 1, wherein the number of significant intervals are a number of message IDs in the interval of duration that are outside of a confidence interval.

9. The computer-implemented method of claim 1, wherein identifying similar intervals to the selected interval duration is performed using k-means clustering.

10. The computer-implemented method of claim 1, wherein determining the interval duration further comprises creating a plot that a user can use to determine whether the selected interval duration is appropriate.

11. A system for determining an interval duration and a training period length for log anomaly detection, the system comprising:
a memory having computer readable instructions; and
a processing device for executing the computer readable instructions, the computer readable instructions comprising:
determining an interval duration for a time series from a plurality of message IDs, wherein determining the interval duration further comprises calculating, by the processing resource, a suggested interval duration based on a number of messages per second written to a file by accumulating a plurality of messages for a list of candidate interval durations in seconds, calculating a number of significant intervals, selecting an interval duration from the list of candidate interval durations that has a maximum percentage of significant intervals, and identifying similar intervals to the selected interval duration, wherein the selecting the interval duration from the list of candidate interval durations that has the maximum percentage of significant intervals is performed by calculating a percentage of significant intervals of total intervals for each candidate interval duration, discarding any interval duration from the list of candidate interval durations that has a percentage equal to 0% or 100%;
determining a training period length based at least in part on the interval duration, wherein determining the training period length further comprises identifying a plurality of potential patterns in the time series using a partial auto correlation and selecting a largest repeating pattern of the plurality of potential patterns, wherein selecting the largest repeating pattern comprises calculating a confidence interval based at least in part on a number of intervals and selecting a largest significant lag;
training a log anomaly detector based at least in part on the training period length; and
performing, by the log anomaly detector, log anomaly detection.

12. The system of claim 11, wherein determining the interval duration further comprises:
counting the number of messages per second; and
writing the number of messages to the file.

13. The system of claim 12, wherein determining the interval duration further comprises:
determining whether the suggested interval duration provides a timely answer to a business problem.

14. The system of claim 13, wherein determining the interval duration further comprises:
responsive to determining that the suggested interval duration provides a timely answer to a business problem, plotting a histogram of the plurality of messages; and
determining whether the histogram of the plurality of messages using the interval duration selected exhibits a central tendency.

15. The system of claim 11, wherein determining the training period length further comprises:
calculating a maximum amount of lag to allow.

16. The system of claim 11, wherein determining the training period length further comprises:
determining whether an amount of non-stationarity exists; and
responsive to determining that an amount of non-stationarity exists, displaying an auto correlation of the plurality of messages between the plurality of potential patterns.

17. The system of claim 11, wherein the number of significant intervals are a number of message IDs in the interval of duration that are outside of a confidence interval.

18. The system of claim 11, wherein identifying similar intervals to the selected interval duration is performed using k-means clustering.

19. The system of claim 11, wherein determining the interval duration further comprises creating a plot that a user can use to determine whether the selected interval duration is appropriate.

20. A computer program product for determining an interval duration and a training period length for log anomaly detection, the computer program product comprising:
a computer readable storage medium having program instructions embodied therewith, the program instructions executable by a processing device to cause the processing device to:
determine an interval duration for a time series from a plurality of message IDs, wherein determining the interval duration further comprises calculating, by the processing resource, a suggested interval duration based on a number of messages per second written to a file by accumulating a plurality of messages for a list of candidate interval durations in seconds, calculating a number of significant intervals, selecting an interval duration from the list of candidate interval durations that has a maximum percentage of significant intervals, and identifying similar intervals to the selected interval duration, wherein the selecting the interval duration from the list of candidate interval durations that has the maximum percentage of significant intervals is performed by calculating a percentage of significant intervals of total intervals for each candidate interval duration, discarding any interval duration from the list of candidate interval durations that has a percentage equal to 0% or 100%;

determine a training period length based at least in part on the interval duration, wherein determining the training period length further comprises identifying a plurality of potential patterns in the time series using a partial auto correlation and selecting a largest repeating pattern of the plurality of potential patterns, wherein selecting the largest repeating pattern comprises calculating a confidence interval based at least in part on a number of intervals and selecting a largest significant lag;

training a log anomaly detector based at least in part on the training period length; and performing, by the log anomaly detector, log anomaly detection.

* * * * *